United States Patent Office 3,822,124
Patented July 2, 1974

3,822,124
HERBICIDAL COMPOSITION
Makoto Konnai, Utsunomiya, Hiroshi Kamata, Shimizu, and Masaru Kado, Yokohama, Japan, assignors to Kumiai Chemical Industry Co., Ltd., Tokyo, Japan
No Drawing. Continuation of abandoned application Ser. No. 868,900, Oct. 23, 1969, which is a continuation-in-part of application Ser. No. 651,148, July 5, 1967, now Patent No. 3,582,314. This application Sept. 8, 1970, Ser. No. 70,502
The portion of the term of the patent subsequent to June 1, 1988, has been disclaimed
Int. Cl. A01n 9/12
U.S. Cl. 71—100         1 Claim

ABSTRACT OF THE DISCLOSURE

A herbicidal composition for selectively killing undesirable weeds in paddy rice fields comprising S-(2-chlorobenzyl)-N,N-di-isopropylthiocarbamate as an active ingredient.

---

The present invention relates to herbicidal compositions containing S-(2-chlorobenzyl)-N,N-di-isopropylthiocarbamate as an active ingredient and a method for controlling or killing undesirable weeds in paddy rice fields by using the above described S-chlorobenzyl-thiocarbamate as the active ingredient.

This application is a continuation of application Ser. No. 868,900, filed Oct. 23, 1969, now abandoned, and a continuation-in-part of our copending application Ser. No. 651,148, filed July 5, 1967, now Pat. No. 3,582,314.

S-chlorobenzyl-thiocarbamate according to the present invention is active as herbicidal composition and has a high activity for controlling germination of various weeds in agricultural field and particularly, said compound can prevent wire grass (*Eleocharis acicularis* Roem. et schult), barnyard grass (*Echinochloa crus-galli* P. Beauv) and crabgrass (*Digitaria adscendens* Henr.), which are main noxious weeds in paddy.

Herbicidal composition applied previously to paddy have involved PCP, NIP (active ingredient: 4-nitro-2',4'-dichlorodiphenyl ether), Prometryne (active ingredient: 2-methylthio-4,6-bis(isopropylamino)- S - triazine) and other numerous compositions, but most of them have been used for controlling germination of weeds after paddy rice plant is planted. These previous herbicidal compositions are effective for therophyte weeds generated at a relatively early stage after planted the rice plant, but have extremely poor activity or substantially no activity for wire grass of perennial weed. Recently, this wire grass has become problem as preferential weed in paddy, because any herbicidal composition, which has no phytotoxicity to paddy rice plant and can prevent exactly wire grass, has never been discovered.

The reason why, wire grass has been unusually grown in paddy, is based on the fact that in general, the previous herbicidal compositions are spread 3 to 7 days after the rice plant is planted, while generation of wire grass is about 2 weeks after planted, that is, wire grass is generated when the activity of the herbicidal compositions are decreased and further wire grass is perennial, so that it has high resistance against the herbicidal composition.

The most active composition for preventing wire grass has been DBN (active ingredient: 2,6-dichlorobenzonitrile), but this composition is highly phytotoxic against paddy rice plant, so that it has problem in practice.

However, the S-chlorobenzyl-thiocarbamate according to the present invention is excellent in the activity for preventing wire grass and particularly, when it is used in an original stage of growth of wiregrass, wire grass is completely prevented in an amount of less than 500 g./10 ares. Particularly, when surface layer of soil or water field paddy is applied with 250 g./10 ares before germination of the weed, the growth of the weeds, such as, wire grass, barnyard grass and crabgrass, etc., can be prevented and paddy rice plant planted in a depth of more than 2 cm. is not damaged. When 800 to 1,000 g./10 ares are used, the growth is slightly suppressed temporarily but hereafter is not affected and this compound has substantially no damage.

Then, a method for producing S-chlorobenzyl-thiocarbamate according to the present invention will be explained in the following.

2-chlorobenzyl mercaptan is dissolved in an inert solvent such as toluene or benzene and to the resulting solution is added dropwise a solution of phosgene in an inert solvent and the resulting mixture is stirred while cooling and added with a hydrochloride acceptor dropwise. Then, the resulting mixture is added dropwise with diisopropylamine and the mixture is reacted. In order to remove hydrochloride of the hydrochloride acceptor (amines) after completion of the reaction, the reaction product is washed with water, dried and concentrated. Furthermore, the resulting liquid is purified by vacuum distillation.

S-chlorobenzyl-thiocarbamate according to the present invention is mixed with diluents involving carriers and surfactants to prepare dust, emulsifiable concentrate and wettable powder, which are used directly or after diluted with water as herbicidal compositions.

Furthermore, said carbamate can be prepared into granular composition. Namely, said thiocarbamate is increased in an amount with bentonite, clay, talc, limestone, etc. and added with a binder, such as, PVA (polyvinyl alcohol) and the resulting mixture is kneaded with water and subjected to an extrusion type of granule forming machine and the formed granules are dried. Alternatively, said thiocarbamate is dissolved in a proper solvent and the solution is homogeneously adsorbed into granular diatomaceous earth, vermiculite, etc. As the other means, by said thiocarbamate is coated surface of granular limestone uniformly. The granules thus obtained are dispersed uniformly by hand, granule spreader, helicopter, etc.

The term "carrier" used herein means carrying agents used for transferring said thiocarbamate to desired areas, which may be solid or liquid. For example, as the solid carrier, mention may be made of various clays, talc, kaoline, diatomaceous earth, calcium carbonate, white carbon, sawdust, etc. As the liquid carrier, use may be made of a solvent for the active ingredient or a liquid which is non-solvent, but can disperse or dissolve the active ingredient through an adjuvant, for example, water, benzene, kerosene, alcohol, acetone, methylnaphthalene, xylene, etc.

The term "surfactants" used herein means unionic surfactants, such as, polyoxyethylenealkylaryl ether, polyoxyethylenesorbitane monolaurate, etc.; cationic surfactants, such as, alkyldimethylbenzyl ammonium chloride, alkylpyridinium halide, etc.; anionic surfactants, such as, alkylbenzene sulfonates, fatty alcohol sulfates, etc.; amphoteric surfactants, such as, lauryl amine derivatives, betaine derivatives, dodecyl diaminoethyl glycine, etc.

The invention will be further explained in detail with reference to the following preparation examples:

EXAMPLE 1

Wettable powder

Twenty five parts by weight of S-(2-chlorobenzyl)-N,N-di-isopropylthiocarbamate, 10 parts by weight of white carbon, 60 parts by weight of diatomaceous earth and 5 parts by weight of wetting agent of a mixture of polyoxyethylenealkyl phenol ether, polyoxyethylenephenylphenol ether and polyoxyethylene carbonate were mixed and milled and the resulting powder was suspended in water, which was sprayed.

EXAMPLE 2

Grandule

Five parts by weight of S-(2-chlorobenzyl)-N,N-di-isopropylthiocarbamate were sprayed on and adsorbed in 95 parts by weight of granular diatomaceous earth, which was being stirred and had 10 to 100 meshes.

EXAMPLE 3

Emulsifiable concentrate

Fifty parts by weight of S-(2-chlorobenzyl)-N,N-di-isopropylthiocarbamate, 30 parts by weight of xylene and 20 parts by weight of an emulsifier of a mixture of polyoxyethylenealkylphenol ether, polyoxyethylenephenylphenol ether and polyoxyethylene carbonate were mixed and dissolved. The resulting solution was diluted with water and then sprayed.

EXAMPLE 4

Granule

Five parts by weight of S-(2-chlorobenzyl)-N,N-di-isopropylthiocarbamate, 15 parts by weight of PCP sodium salt, 50 parts by weight of bentonite, 27 parts by weight of clay, 1 part by weight of sodium alkyl-arylsulfonate and 2 parts by weight of sodium ligninsulfonate were mixed and milled and then added with a suitable amount of water and kneaded and the kneaded mixture was subjected to an extrusion type of granule forming machine (open having 1 mm. diameter) to obtain granules, which were dried.

In order to show the activity of the herbicidal compositions of the present invention, Experimental Examples are described as follows:

EXPERIMENTAL EXAMPLE 1

Three groups of 3-leaf stage young paddy rice plant (species: Kinmaze), one group of which has two rice plants, were planted in a pot of 15 cm. diameter. After the rice plant took, 30 barnyard grass seeds per pot were sowed on the surface layer of the soil and the pot was filled with water to a depth of 1 cm. and one day later granular compositions containing 5% active ingredients of the present invention (Example 2) were spread in such amounts that the amounts of active ingredients were 100 g., 250 g. and 500 g. per 10 ares. Two weeks after the treatment, the growth degree of the weed and the phytotoxicity on the paddy rice plants were estimated.

| Active ingredient | Dose, g./10 a. | Number of Barnyard grass plants | Number of broad-leaf weeds | Phytotoxicity on paddy rice plant |
|---|---|---|---|---|
| Compound A | 500 | 0 | 0 | No damage. |
| Do | 250 | 1 | 1 | Do. |
| Do | 100 | 2 | 3 | Do. |
| Compound B | 500 | 1 | 4 | Heavy damage. |
| Do | 250 | 4 | 9 | Slight damage. |
| Do | 100 | 9 | 15 | No damage. |
| Non-treated | | 30 | 36 | Do. |

Compound A is S-(2-chlorobenzyl)-N,N-di-iisopropyl-thiocarbamate, compound B is S-benzyl-N,N-di-isopropyl-thiocarbamate as comparative compound.

EXPERIMENTAL EXAMPLE 2

Test for controlling weeds in paddy rice field and for phytotoxicity on paddy rice plant Test method: A surface layer of paddy soil containing seeds of the weed was fed in a Wagner pot of 1/5,000 are and stirred thoroughly therein. Then two groups of 2 to 3 leafstage paddy rice plant (species: Kinmaze), each of which being composed of two paddy rice plants, were transplanted in the pot, on the next day a given amount of germinated barnyard grass seeds (50 seeds per pot) was sowed thereon, and the pot was filled with water to a depth of 3 cm., and three days later a test solution obtained by diluting wettable powder of test compound shown in the following Table with 10 cc. of water, were dropped on the pot at a dose shown in the Table by means of a pipette. Twenty days after the treatment, the herbicidal activity and the phytotoxicity on paddy rice plant were determined.

| Active ingredient | Dose, g./10 a. | Barnyard grass | Wiregrass | Broadleaf weeds | Phytotoxicity on paddy rice plant |
|---|---|---|---|---|---|
| isoC₃H₇\N-C(=O)-S CH₂-C₆H₄-Cl / isoC₃H₇ | 100 | 5 | 4 | 3 | − |
| | 200 | 5 | 4.5 | 3 | − |
| | 400 | 5 | 4.5 | 4.5 | − |
| isoC₃H₇\N-C(=O)S-CH₂-C₆H₅ / isoC₃H₇ (Comparative compound) | 100 | 4.5 | 3 | 0 | + |
| | 200 | 5 | 4 | 0 | + |
| | 400 | 5 | 4.5 | 2 | + to ++ |
| C₂H₅\N-C(=O)-S CH₂-C₆H₄-Cl / C₂H₅ (Comparative compound) | 100 | 5 | 4.5 | 3 | + |
| | 200 | 5 | 5 | 4.5 | ++ |
| | 400 | 5 | 5 | 5 | +++ |
| isoC₃H₇\N-C(=O)-S CH₂-C₆H₄-Cl / isoC₃H₇ (Comparative compound) | 100 | 0 | 0 | 0 | − |
| | 200 | 2 | 0 | 2 | − |
| | 400 | 3 | 3 | 2 | ± |
| isoC₃H₇\N-C(=O)-S-CH₂-C₆H₃-Cl₂ / isoC₃H₇ (Comparative compound) | 100 | 0 | 0 | 0 | − |
| | 200 | 3 | 2 | 1 | − |
| | 400 | 4 | 4 | 3 | + |

TABLE—Continued

| Active ingredient | Dose, g./10 a. | Barnyard grass | Wiregrass | Broadleaf weeds | Phytotoxicity on paddy rice plant |
|---|---|---|---|---|---|
| isoC$_3$H$_7$\\N—C—S—CH$_2$—C$_6$H$_3$Cl$_2$(2,6) / isoC$_3$H$_7$ / O (Comparative compound) | 100<br>200<br>400 | 0<br>0<br>1 | 0<br>0<br>2 | 0<br>0<br>2 | —<br>—<br>+ |
| isoC$_3$H$_7$\\N—C—S—CH$_2$—C$_6$H$_3$Cl$_2$(2,4) / isoC$_3$H$_7$ / O (Comparative compound) | 100<br>200<br>400 | 0<br>0<br>0 | 0<br>0<br>0 | 0<br>0<br>0 | —<br>—<br>— |
| isoC$_3$H$_7$\\N—C—S—CH$_2$—C$_6$H$_3$Cl$_2$(2,6) / isoC$_3$H$_7$ / S (U.S.P. 2992091) | 100<br>200<br>400 | 0<br>0<br>1 | 0<br>0<br>0 | 0<br>1<br>2 | —<br>—<br>— |
| isoC$_3$H$_7$\\N—C—S—CH$_2$—C$_6$H$_2$Cl$_3$(2,3,6) / isoC$_3$H$_7$ / S (U.S.P. 2992091) | 100<br>200<br>400 | 0<br>0<br>1 | 0<br>0<br>0 | 0<br>0<br>1 | —<br>—<br>— |
| isoC$_3$H$_7$\\N—C—S—CH$_2$—C$_6$H$_3$Cl$_2$(2,5) / isoC$_3$H$_7$ / S (U.S.P. 2992091) | 100<br>200<br>400 | 0<br>0<br>1 | 0<br>0<br>0 | 0<br>1<br>2 | —<br>—<br>— |
| isoC$_3$H$_7$\\N—C—SCH$_2$—C$_6$H$_3$Cl$_2$(2,3) / isoC$_3$H$_7$ / O (Comparative compound) | 100<br>200<br>400 | 0<br>0<br>0 | 0<br>0<br>0 | 0<br>0<br>0 | —<br>—<br>— |
| C$_2$H$_5$\\N—C—SCH$_2$—C$_6$H$_3$Cl$_2$(2,4) / C$_2$H$_5$ / O (Comparative compound) | 100<br>200<br>400 | 0<br>2<br>2 | 0<br>0<br>0 | 0<br>0<br>0 | —<br>—<br>— |
| n-C$_3$H$_7$\\N—C—SCH$_2$—C$_6$H$_4$Cl / n-C$_3$H$_7$ / O (Comparative compound) | 100<br>200<br>400 | 0<br>0<br>0 | 0<br>1<br>3 | 2<br>4<br>5 | —<br>—<br>— |
| n-C$_4$H$_9$\\N—C—S—CH$_2$—C$_6$H$_4$Cl / n-C$_4$H$_9$ / O (Comparative compound) | 100<br>200<br>400 | 0<br>0<br>0 | 0<br>0<br>0 | 0<br>0<br>0 | —<br>—<br>— |
| isoC$_3$H$_7$\\N—C—SCH$_2$—C$_6$H$_4$Cl / isoC$_3$H$_7$ / S (U.S.P. 2992091) | 100<br>200<br>400 | 0<br>0<br>1 | 0<br>0<br>2 | 0<br>1<br>3 | —<br>+<br>++ |
| isoC$_3$H$_7$\\N—C—SCH$_2$—C$_6$H$_4$Cl / isoC$_3$H$_7$ / S (U.S.P. 2992091) | 100<br>200<br>400 | 0<br>0<br>1 | 0<br>0<br>1 | 0<br>1<br>2 | —<br>+<br>++ |

TABLE—Continued

| Active ingredient | Dose, g./10 a. | Barnyard grass | Wiregrass | Broadleaf weeds | Phytotoxicity on paddy rice plant |
|---|---|---|---|---|---|
| $\text{(isoC}_3\text{H}_7\text{)}_2\text{NC(S)SCH}_2\text{-C}_6\text{H}_3\text{Cl}_2$ (2,4-Cl) (U.S.P. 2992091) | 100 | 0 | 0 | 0 | — |
| | 200 | 0 | 0 | 0 | — |
| | 400 | 1 | 1 | 2 | + |
| $\text{(isoC}_3\text{H}_7\text{)}_2\text{NC(S)SCH}_2\text{-C}_6\text{H}_2\text{Cl}_3$ (2,4,5-Cl) (U.S.P. 2992091) | 100 | 0 | 0 | 0 | — |
| | 200 | 0 | 0 | 0 | — |
| | 400 | 0 | 0 | 0 | — |
| $\text{(isoC}_3\text{H}_7\text{)}_2\text{NC(S)SCH}_2\text{-C}_6\text{H}_2\text{Cl}_3$ (2,4,6-Cl) (U.S.P. 2992091) | 100 | 0 | 0 | 0 | — |
| | 200 | 0 | 0 | 0 | — |
| | 400 | 0 | 0 | 0 | — |
| $\text{(isoC}_3\text{H}_7\text{)}_2\text{NC(S)SCH}_2\text{-C}_6\text{H}_2\text{Cl}_3$ (2,3,4-Cl) (U.S.P. 2992091) | 100 | 0 | 0 | 0 | — |
| | 200 | 0 | 0 | 0 | — |
| | 400 | 0 | 0 | 0 | — |
| 2-Cl-C$_6$H$_3$-O-C$_6$H$_4$-NO$_2$ (Comparative compound, NIP) | 100 | 5 | 3 | 5 | + to ++ |
| | 200 | 5 | 4 | 5 | +++ |
| | 400 | 5 | 5 | 5 | +++ |
| C$_6$Cl$_5$ONa (Comparative compound, PCP-Na) | 100 | 4 | 2 | 3.5 | — |
| | 200 | 5 | 3 | 4.5 | — |
| | 400 | 5 | 3.5 | 5 | + |

NOTE:
0=100% growth (the same effect as in non-treated area).
to
5=no growth (complete withering).
—=no damage.
to
+++=maximum damage (complete withering).

What is claimed is:

1. A method for killing grassy and broad leaf weeds in areas containing such weeds and rice plants which comprises applying to such areas and contacting said grassy and broad leaf weeds and said rice plants with a phytotoxic amount with respect to said weeds and non-injurious amount with respect to said rice plants of a composition comprising as an active herbicidal ingredient, S-(2-chlorobenzyl)-N,N-di-isopropylthiocarbamate and an inert diluent.

References Cited

UNITED STATES PATENTS

| 2,992,091 | 7/1961 | Harman et al. | 71—100 |
| 3,582,314 | 1/1971 | Konnai et al. | 71—100 |

FOREIGN PATENTS

| 995,497 | 6/1965 | Great Britain | 71—100 |

JAMES O. THOMAS, Jr., Primary Examiner